United States Patent
Buelow

(10) Patent No.: US 10,182,537 B1
(45) Date of Patent: Jan. 22, 2019

(54) ROTOMOLDED VERTICAL FARMING APPARATUS AND SYSTEM

(71) Applicant: Just Greens, LLC, Newark, NJ (US)

(72) Inventor: Roger Buelow, Pepper Pike, OH (US)

(73) Assignee: Just Greens, LLC, Newark, NJ (US)

( * ) Notice: Subject to any disclaimer, the term of this patent is extended or adjusted under 35 U.S.C. 154(b) by 158 days.

(21) Appl. No.: 15/407,652

(22) Filed: Jan. 17, 2017

Related U.S. Application Data

(60) Provisional application No. 62/278,652, filed on Jan. 14, 2016.

(51) Int. Cl.
*A01G 31/06* (2006.01)

(52) U.S. Cl.
CPC .................... *A01G 31/06* (2013.01)

(58) Field of Classification Search
CPC ........ A01G 31/06; A01G 31/02; A01G 31/04; A01G 31/047
See application file for complete search history.

(56) References Cited

U.S. PATENT DOCUMENTS

| | | | | |
|---|---|---|---|---|
| 4,189,867 A | * | 2/1980 | Schneck | A01G 31/02 47/62 R |
| 5,440,836 A | * | 8/1995 | Lee | A01G 31/06 47/59 R |
| 9,332,695 B2 | * | 5/2016 | Hwang | A01G 9/022 |
| 2009/0000189 A1 | * | 1/2009 | Black | A01G 27/02 47/82 |
| 2015/0059244 A1 | * | 3/2015 | Hashimoto | A01G 9/025 47/79 |
| 2017/0265410 A1 | * | 9/2017 | Lin | A01G 31/06 |
| 2017/0354096 A1 | * | 12/2017 | Xing | A01G 9/023 |

OTHER PUBLICATIONS

U.S. Appl. No. 62/278,652, filed Jan. 14, 2016.

\* cited by examiner

*Primary Examiner* — Kristen C Hayes
(74) *Attorney, Agent, or Firm* — John Pillion

(57) ABSTRACT

A growing system is provided that includes a rotomolded chassis that defines (i) an "interior" where plants are/may be located, and (ii) an "exterior" that at least partially defines a perimeter around the interior. The chassis generally includes stacking elements which allow one chassis to be stacked one upon the other. The disclosed growing system also generally includes (i) means for delivering liquid into the chassis, (ii) means for draining liquid from the chassis, and (iii) means for supporting plants that is conducive to their growing within the chassis.

19 Claims, 19 Drawing Sheets

ROTOMOLDED VERTICAL FARMING APPARATUS AND SYSTEM

CROSS-REFERENCE TO RELATED APPLICATION

The present application claims priority benefit to a provisional application entitled "Rotomolded Vertical Farming Apparatus and System," which was filed on Jan. 14, 2016, and assigned Ser. No. 62/278,652. The entire content of the foregoing provisional patent application is incorporated herein by reference.

BACKGROUND

1. Technical Field

The present disclosure is directed to rotomolded apparatus and systems for use in vertical farming applications.

2. Background Art

Indoor farming growing environments serve multiple functions, including supporting plants, allowing nutrients to be delivered, and forming barriers to pests. Indoor farming growing environments also should not block light from reaching the plants. Indoor farming growing environments usually also provide for a draining path for a controlled flow of liquids that are provided to the plants that are in excess of what the plant can immediately use.

Vertical farming environments, or grow systems, also have the requirement that these systems provide the physical support to allow construction of a plurality of layers of plants. This plurality of layers also typically requires the use of artificial lighting and the grow system needs to support the artificial lights and the power feed that energizes the lights.

For small scale operations, or for single layer constructions, the industry has generally made use of PVC pipes and aluminum gutters in fabricating a chassis which defines most of any particular grow system. These constructions are designed to flow nutrient solution along through the pipe/gutter. Plants are supported by the pipe wall or by a secondary medium (often Styrofoam or plastic) that allows the roots to dangle into the body of the pipe/gutter and take up nutrients. This type of construction requires drilling many holes and mounting many pipes/gutters. The construction process is extremely labor intensive and installation is best described as an art. These types of systems are crafted in place rather than assembled.

For large scale operations, a typical construction may involve building a large pond that is periodically refreshed with additional nutrient solution. In this case, the perimeter of the pond (typically cement) provides the structural support for the nutrient solution, and then Styrofoam "rafts" float on the water and allow plants to extend roots through holes in the Styrofoam into the nutrient solution.

None of these methods for construction effectively scale for use in large scale, vertical farming. Vertical farming requires many layers/levels of plant growth and structures to hold the vertically-spaced plants. Small scale operations may be feasible, but require a tremendous amount of labor to assemble conventional assemblies because, inter alia, each opening for plants generally must be crafted individually.

What is needed is a mass produced apparatus/system that handles many of the functions required of a vertical farm growing system in one unit. The ideal apparatus/system will be low cost, low weight and simple to assemble. The ideal apparatus/system will lend itself to being constructed on the ground. The ideal apparatus/system will be easy to clean. The ideal apparatus/system will be easy to transport to the vertical farm construction site where it will be easy to assemble. These and other objectives are achieved according to the present disclosure.

SUMMARY

According to exemplary embodiments of the present disclosure, a growing system is provided that includes a rotomolded chassis that defines (i) an "interior" where plants are/may be located, and (ii) an "exterior" that at least partially defines a perimeter around the interior. The chassis generally includes stacking elements which allow one chassis to be stacked one upon the other. The disclosed growing system also generally includes (i) means for delivering liquid into the chassis, (ii) means for draining liquid from the chassis, and (iii) means for supporting plants that is conducive to their growing within the chassis.

The disclosed growing system may further include means for containing liquid within the chassis below the plane of the plants, such means optionally extending around the entire perimeter of the rotomolded chassis so that in normal operation, no liquid exits the chassis except through the means for draining liquid. Normal operation generally includes all operations where the volume of water in the rotomolded chassis is less than the volume bounded by the rotomolded chassis and the plane where the plants are growing.

The rotomolded chassis may advantageously be of dual wall design. The dual wall design may completely enclose at least one hollow cavity that is essentially sealed from the environment.

The means for delivering liquid into the chassis may comprise a hollow space defined by the outer surface of the rotomolded chassis. The means for draining liquid into the chassis may comprise a hollow space defined by the outer surface of the rotomolded chassis. The wall thickness of the rotomolded chassis may be over 0.1".

The means for supporting plants may take the form of one or more ledges molded into the chassis. In other embodiments, the means for supporting plants may take the form of a step molded into the chassis. In still further embodiments, the means for supporting plants may take the form of a protrusion molded into the chassis. Still further, the means for supporting plants may take the form of a plurality of elements molded into the chassis. In exemplary embodiments, the means for supporting plants comprises at least one element that is attached to the chassis. The at least one element may be attached with an adhesive. The at least one element may alternatively (or additionally) be attached by sliding into a groove or channel on the chassis. The attached element may be of lower coefficient of friction than the chassis. The at least one element may be attached with a mechanical fastener.

The stacking elements may be comprised of male protrusions on one chassis and female recesses on a mating chassis. The stacking elements may be comprised of pegs protruding from one chassis and female holes on a mating chassis. In exemplary embodiments, the stacking elements extend along over approximately 50% of one edge of the chassis. The stacking elements may include at least one feature formed by removing material from the chassis. The at least one feature may be formed by removing material from the chassis to define a hole that a peg from a mating chassis is configured and dimensioned to extend through.

The stacking elements may be comprised of hook and mesh (Velcro) elements. The stacking elements may further comprise a mechanical fastener to secure two chassis together.

The means for delivering liquid into the chassis may be comprised of a hollow area that is formed by the outer walls of the chassis. The hollow area may be comprised of a hole that extends from the exterior of the chassis into the interior of the chassis. The means for delivering liquid may include plumbing elements. The plumbing elements may be spin welded in place into the chassis. The plumbing elements may include a pipe suitable for delivering liquid. The plumbing elements may also include means of connecting to a liquid delivery system. The plumbing elements may also include means for modifying the output of the means of delivering liquid. The modification may be designed to produce an essentially laminar flow from the delivery means. The modification may be designed to produce a turbulent flow from the delivery means. The modification may be designed to produce a spray from the delivery means. The spray may be sufficiently fine to be defined as atomized.

The plumbing elements may include a flange that is spun welded into a hollow area formed by the outer walls of the chassis. The plumbing element may further comprise additional plumbing components attached to the flange.

The means for delivering liquid may be comprised of (i) a hollow area formed by the outer walls of the chassis, (ii) a length of pipe that extends through the hollow area, (iii) a plumbing fitting that connects to the input end of the pipe, and (iv) a nozzle that connects to the output end of the pipe. The pipe may fill over half the cross sectional area of the hollow area. The pipe may be cemented in place in the hollow area. The hollow area may be sealed around the pipe to prevent water/nutrient solution from flowing through the hollow area in the region defined by the exterior of the pipe and the interior of the hollow area.

The means for delivering liquid may be comprised of (i) a hollow area formed by the outer walls of the chassis, (ii) a flange spin welded into the hollow area, (iii) a length of pipe that extends through the hollow area and is mechanically attached to the flange, (iv) a plumbing fitting that connects to the input end of the pipe, and (v) a nozzle that connects to the output end of the pipe.

The means for delivering liquid may be comprised of (i) a hollow area formed by the outer walls of the chassis, (ii) a flange spin welded into the hollow area, (iii) a length of pipe that extends through the hollow area and is mechanically attached to the flange, (iv) a plumbing fitting that connects to the input end of the flange, and (v) a nozzle that connects to the output end of the pipe.

The means for draining liquid from the chassis may be comprised of a hollow area that is formed by the outer walls of the chassis. The hollow area may be comprised of a hole that extends from the exterior of the chassis into the interior of the chassis. The means for draining liquid may include plumbing elements. The plumbing elements may be spin welded in place into the chassis. The plumbing elements may include a pipe suitable for transporting liquid. The plumbing elements may include a means of connecting to a liquid draining system. In exemplary embodiments, the plumbing elements include a flange that is spun welded into a hollow area formed by the outer walls of the chassis. The plumbing element may further comprise additional plumbing components attached to the flange.

The means for delivering liquid is comprised of (i) a hollow area formed by the outer walls of the chassis, (ii) a length of pipe that extends through the hollow area, and (iii) a plumbing fitting that connects to the output end of the pipe.

The disclosed growing system may further include a screening means to prevent large objects from entering the pipe. A trap may be provided to prevent gasses from flowing upstream into the pipe.

The disclosed growing system may further comprise means for supporting electric lights. The means for supporting electric lights may be comprised of at least one ledge shaped to mate with at least one surface of an electric light. The means for supporting electric lights may be comprised of at least one recess within the rvft shaped to mate with a mechanical connector. The mechanical connector may be molded in the electric light. The mechanical connector may extend through a hole or slot in the electric light. The mechanical connector may take the form of a screw, a barbed fitting or an expanding fitting.

The means for supporting electric lights may be comprised of a hollow area that is sized to allow at least 181 degrees of the electric light and positioned to attach the electric light to the chassis. The means for supporting electric lights may be further comprised of the electrical connection to the light.

The disclosed growing system may include at least one surface of the chassis shaped to reflect light energy onto the plants targeted by at least one electric light, where the amount of light energy transferred from the at least one electric light to the plants targeted by the at least one electric light is increased by the presence of the surface. The at least one surface may be substantially flat or substantially curved. The at least one surface may exhibit over 30% reflectivity. The at least one surface may be colored differently than the rest of the chassis. The at least one surface may be painted to achieve the different color.

The at least one surface may further comprise (i) a substantially planar surface running substantially parallel with an axis of the electric light, (ii) the substantially planar surface extending substantially along the entire length of the electric light, (iii) the substantially planar surface being between 1× to 5× the dimension of the light measured in an axis perpendicular to the axis of the electric light to which the substantially planar surface runs parallel, and (iv) the substantially planar surface having reflectivity of light of over 30%. The reflectivity of light may be over all of white light, and may be for the wavelengths 400-500 nm, or for the wavelengths 600-700 nm.

The chassis may include at least one strengthening feature, such as a hole or pylon. The at least one strengthening feature may also used as a drain. The at least one strengthening feature may also be used as a stacking element to locate or fasten one chassis to another.

The growing system may include a plurality of holes. The plurality of holes may be positioned in the chassis, each draining into a common collection means. The collection means may be comprised of a gutter. The growing system may include two pluralities of holes. The two pluralities of holes may define two parallel lines, each draining into their own common collection means. The common collection means may extend to collect drained liquid from a plurality of chassis.

The growing system may further include structural elements that allow the chassis to be moved with a forklift or pallet jack. The structural elements may include at least a pair of cavities of size and shape to match a forklift fork or pallet jack fork. The chassis are advantageously designed to allow tight packing during transportation. Tight packing can be defined as nesting where one chassis at least partially sits within the next. The chassis tight packing may be achieved by stacking the chassis in an orientation different than that used during operation.

The means for delivering liquid and means for draining liquid disclosed herein may share at least one element. The at least one common element may be a hollow area or pipe where liquid flows. The at least one common element may include a nozzle-flap where liquid flows over during draining and liquid flows through it during liquid delivery. Pressure from a delivery pump may cause the components of the common element to mechanically realign to achieve different functions.

The at least one element may further comprise (i) a hollow area or pipe, (ii) a hinged nozzle-flap that is contained within the hollow area or pipe, (iii) a surface for the nozzle-flap to seat against, and (iv) at least one portion of the nozzle-flap that is an orifice allowing liquid to flow through the nozzle-flap. The growing system may further include a flexible gasket set between the hinged nozzle-flap and the surface. The portion of the nozzle-flap that is an orifice may advantageously extend beyond (e.g., above) the seating plane of the nozzle-flap. The extension beyond the seating plane may be at least 5 mm. The at least one portion of the nozzle-flap that is an orifice may form a plurality of orifices. The orifice(s) may be sized to atomize the liquid forced through it/them.

The rotomolded chassis may be of a single wall design.

Two chassis may be molded in the same mold cavity and cut apart from each other. A growing tray may be molded in the same mold cavity and may be cut apart from the chassis. The growing tray may be molded with a plurality of recesses. The plurality of recesses may be cut away at an elevation that results with the growing tray having a plurality of openings. The plurality of openings may number over 30. The openings may be between 2 and 20 square inches in area as projected onto the plane of seed location.

The means for draining liquid from the chassis may include holes cut into the chassis allowing liquid to flow into the at least one hollow cavity inside a dual wall chassis.

The growing system may be fabricated, in whole or in part, from PET, polyethylene (PE), high density PE (HDPE), and/or polypropylene (PP).

The disclosed growing system may be advantageously fabricated such that the weight of the chassis may be lifted by one person. The weight of the chassis may be under 50 lbs. In alternative implementations, the weight of the chassis is such that it can be lifted by two people. In such alternative embodiments, the weight of the chassis is under 100 lbs.

The liquid drained from at least one chassis may be directed into a chassis of lower elevation.

The disclosed growing system may further comprise at least one growing tray where plants grow upon a medium. The growing tray is advantageously able to slide out at least one opening in the chassis without tipping the growing tray beyond 5 degrees of horizontal. The at least one opening is generally tall enough to allow plants that are of mature height to exit the chassis without touching the chassis. A plurality of growing trays can generally fit within the chassis simultaneously. At least one of the growing trays generally cannot be directly removed from the chassis without interfering with the plants and roots of another growing tray or without interfering with the chassis. A single location in the chassis may be provided of sufficient size to remove a growing tray without having plants that are of mature height have their leaves touch the chassis. The mature plant height may be on the order of at least 4".

The plurality of growing trays may number three trays. The single location in the chassis for efficacious tray removal may be substantially in the center of the chassis when viewed from the direction of unloading. The three trays may be unloaded by removing the center tray first, then one of the sides, then the other.

According to the present disclosure, a plurality of stacked chassis can generally be lifted at one time and moved with a fork lift. Preferably, at least 6 stacked chassis can be lifted at one time and moved with a fork lift. Preferably, a stack of chassis extending 30' tall can be lifted at one time and moved with a forklift.

An electric light may be located within the hollow cavity defined by a dual walled rotomolded chassis according to the present disclosure. A second joiner element may be integrated in between the two chassis being stacked, and the joiner element(s) may includes mechanical elements which mate with the stacking elements in the chassis. The means for supporting electric lights may be located within the joiner element. The means for supporting electric lights may comprise a ledge on one joiner element and a plane for a screw to attach to another joiner. The means for supporting electric lights may comprise a ledge on one joiner element and a recess for a barbed connector to attach to another joiner.

Additional features, functions and benefits of the disclosed growing systems will be apparent from the detailed description which follows, particularly when read in conjunction with the appended figures.

BRIEF DESCRIPTION OF FIGURES

To assist those of skill in the art in making and using the apparatus, systems and methods of the present disclosure, reference is made to the following figures wherein.

DESCRIPTION OF EXEMPLARY EMBODIMENTS

Figure 1:
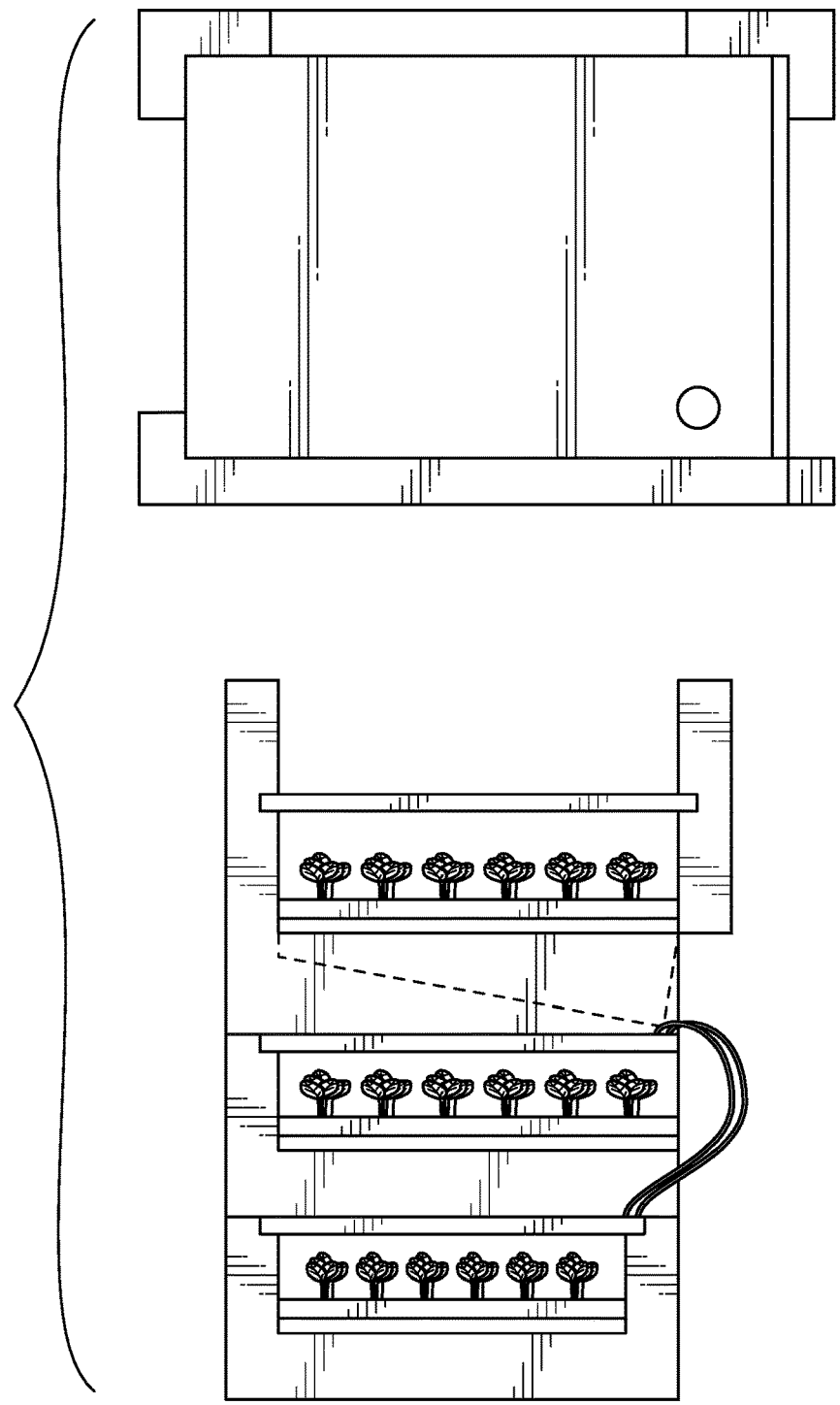
FIGS. 1-22 provide schematic views of various embodiments of the disclosed growing systems, including exemplary components and system implementations thereof.
Figure 2:
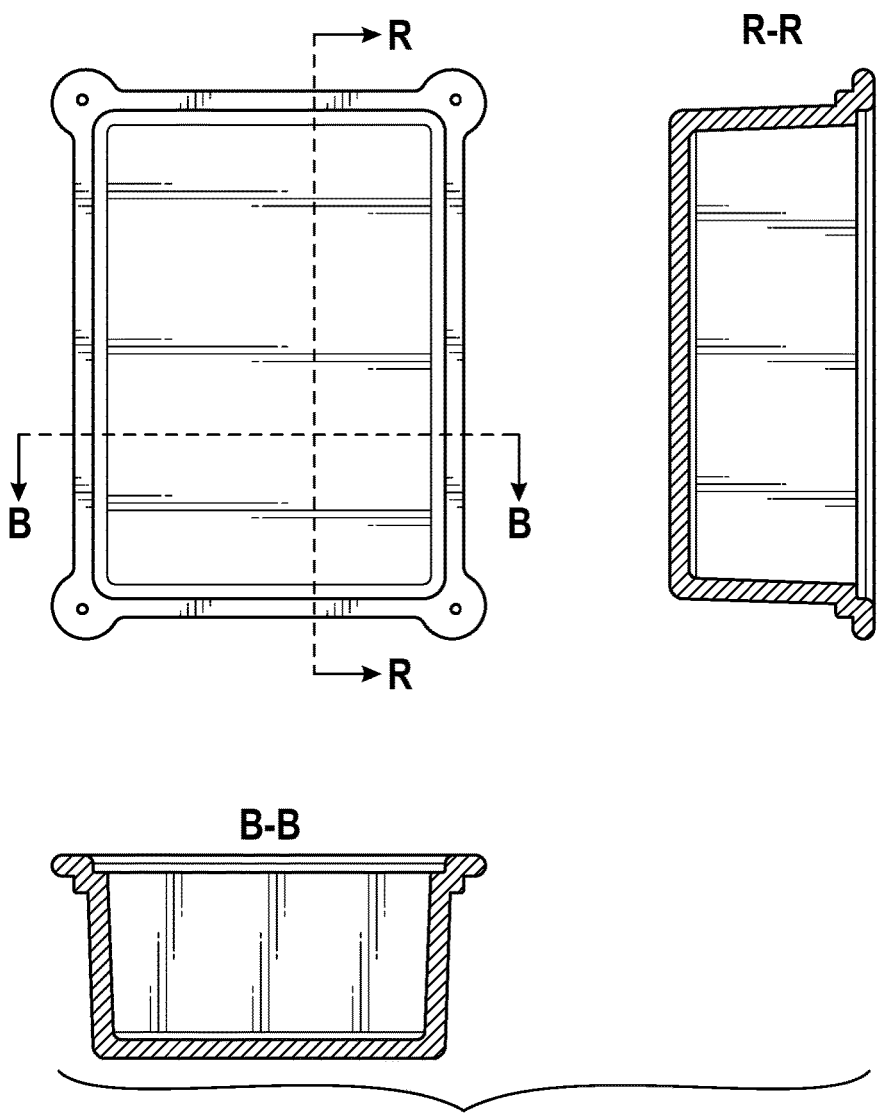
Figure 3:
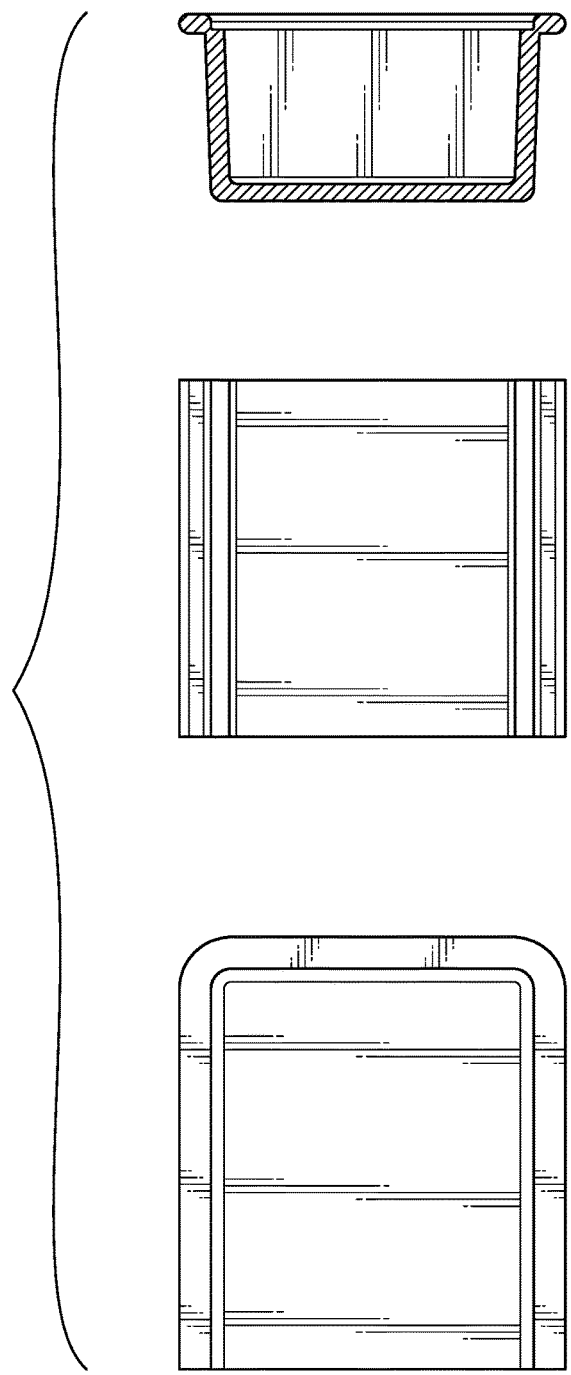

According to the present disclosure, a rotomolded vertical farming tub (rvft) and associated systems are provided that incorporate and/or address many functions desired for vertical farming a single, highly efficient and effective design.

As used herein "rotomolding" is a method of manufacturing plastic components and "rotomolded" refers to a component or assembly fabricated, in whole or in part, using a rotomolding technique. Rotomolding is used to make large plastic components like children's play houses, slides, and kayaks. The dual wall construction of rotomolded components can lend strength and other features.

According to the present disclosure, the rvft includes one or more structures/structural features that function to support the plants that will grow there. The disclosed structures and/or structural features may directly support the plants or such structures/structural features may function to support one or more secondary devices that support the plants. An exemplary secondary device for use in supporting plants may take the form of a growing tray that contains and/or supports media upon which the plants grow. An exemplary method for supporting a growing tray is a ledge or other structural feature(s) that is/are molded into the side of the rvft or otherwise supported by the rvft. In exemplary implementations, a ledge (or series of ledges) can be formed as a step or as a protrusion or as a series of small ledges. These ledges are typically formed to support opposite sides of a rectangular growing tray, but they also can be formed to support three or four sides of a rectangular unit/tray. For example, ledges can be formed or defined to support any number of sides of polygonal growing trays of any number of sides.

As noted above, the ledge(s) can be comprised of one or more separate elements that are attached to the rvft. The separate element(s) can be of a lower coefficient of friction relative to the material used to form the rvft so that the growing trays or other plant supporting devices can be moved along the means of support easily.

The rvft generally includes one or more structures that contain and/or route nutrient solution for delivery to the plants. In exemplary embodiments of the present disclosure, delivery of nutrient solution may be advantageously accomplished by way of one or more sidewalls that define interior volumes or regions that are adapted to contain and route the fluid. The interior volumes/regions may advantageously extend all the way to the plane where the plants are supported to efficaciously deliver the nutrient solution to the desired location(s) and to prevent liquid from spilling or spraying out of the rvft.

In exemplary embodiments of the present disclosure, the interior volumes/regions may be defined in the rvft sidewalls along the entire perimeter of the rvft structure or along a portion thereof. The interior volumes/regions are advantageously sized and located to receive and contain the liquid within the rvft for efficient storage and delivery purposes.

An exemplary construction of the disclosed rvft is to have the sidewalls contain liquid along two sides of the rvft. This allows multiple rvfts to be nested along the direction where the liquid is not contained and allows liquid flowing into one rvft to also contribute to the nutrition of the plants in its neighbors. This construction may benefit from either a full circle of rvfts to be constructed or for a barrier to be constructed at both ends of a plurality of rvfts constructed/arranged in a linear fashion.

A preferred construction is to have the interior volumes/regions defined by the sidewalls to completely contain the liquid within each rvft, i.e., to accomplish all routing of the liquid through the noted interior volumes/regions. This exemplary implementation will generally define fluid-transporting interior volumes/regions within the sidewalls along the entire perimeter of the rvft, i.e., along and within all four (4) sides of a rectangular implementation of the disclosed rvft according to the present disclosure.

The disclosed rvft advantageously includes structures for nutrient solution delivery into the interior volumes/regions defined by the rvft and then delivery from the interior volumes/regions to the plants/plant roots, e.g., as supported by and on growing tray(s). In exemplary embodiments, an inlet to the interior volumes/regions may include a hollow space/opening molded into the rvft, but can also include a plumbing fitting that is inserted into the molded hollow space and which may fill the majority of the hollow space. This plumbing fitting could be comprised of a fitting to attach to a nutrient solution delivery source.

Additional plumbing element(s) may be associated with the present disclosure, e.g., an internal pipe positioned, in whole or in part, within the interior volume/region to transport the nutrient solution to a desired location. In such implementations, the internally positioned pipes may provide more controlled flow of nutrient solution thru the rvft. In further exemplary embodiments of the present disclosure, one or more output devices may be provided that modify and/or control the flow of the nutrient solution as it exits the internal volume/region, e.g., to create turbulent, laminar or even atomized flow therefrom. The output device could take the form of a nozzle that functions to modifying the exit flow to atomize the nutrient solution.

Atomized flow is well known to those skilled in the art as the flow at which a spray or mist exits the orifice and can create a general misting of liquid particles in the air.

Figure 4:
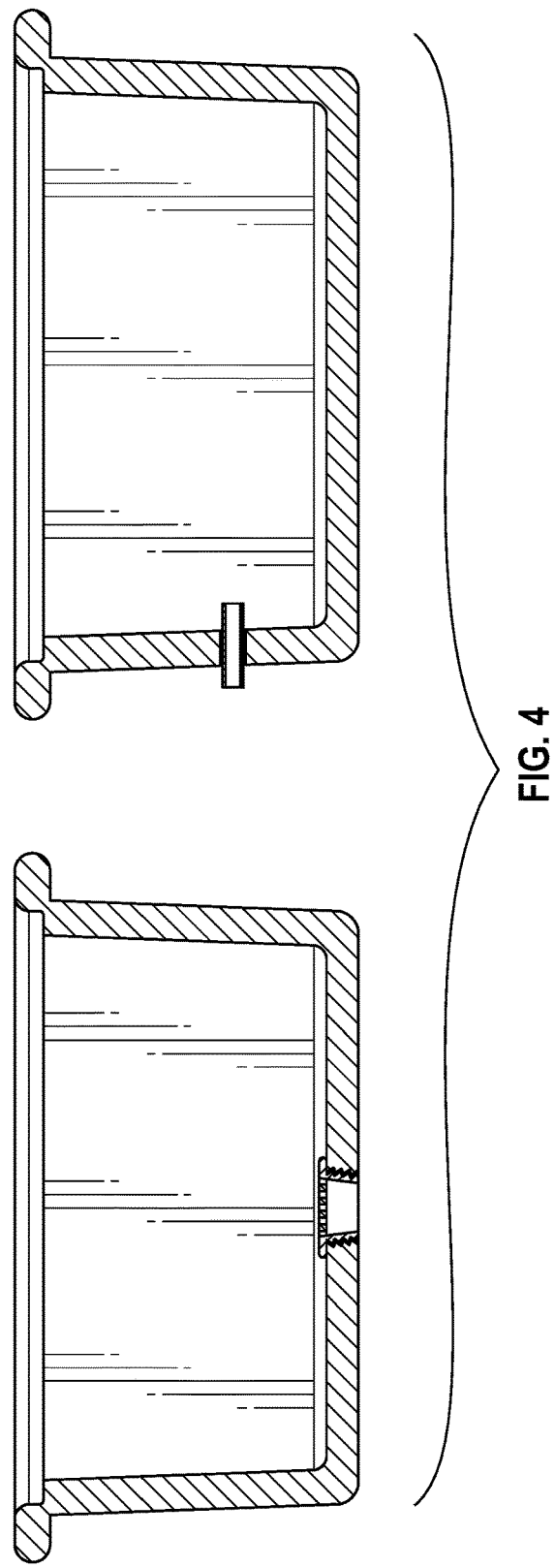

As shown in FIG. 4, a hollow interior volume/region is molded into the side walls of an exemplary rvft. In such exemplary implementation, the outer walls of a dual wall construction rvft define the interior volume/region for containing and transporting nutrient solution according to the present disclosure.

The disclosed rvft may include structures and/or features to facilitate nutrient solution evacuation, i.e., to flow nutrient solution out of the rvft. In exemplary embodiments, a hollow space may be molded into the rvft for this purpose. This hollow space can also include a plumbing fitting comprised of plumbing elements typical in construction of drains. The evacuation functionality could include structures and/or features for screening large materials from entering the drain, a pipe that slopes down, a trap, and/or a pipe that extends to allow the exiting nutrient solution to deposit into a larger stream that includes nutrient solution that drained from a plurality of rvfts.

The disclosed rvft generally includes features which allow multiple rvfts to be stacked one upon the other, creating a vertical stack of at least two rvfts. The disclosed stacking features could be molded such that the rvfts directly stack upon each other, or they could be molded such that an intermediary "joiner" element is mounted in between the two rvfts. These stacking features allow for a plurality of rvfts to be stacked in a single vertical stack, e.g., 20 rvfts to be positioned in one vertical stack, so the material and shape of the rvft will typically be designed to support far more than its own weight.

The rvft generally includes features to hold sources of electric light. These light holding features could allow for light bulbs or light fixtures to be directly secured to the rvft using fasteners or for such light bulbs/fixtures to be directly snapped into place. The light holding features may further comprise shapes which beneficially direct the light energy generated by the electric light bulb or electric light fixture to increase the amount and/or characteristics of light energy that strikes the plants.

The rvft typically includes strengthening elements which are molded into the body of the rvft. These strengthening elements can include "pylons" or through holes. These strengthening elements may advantageously define areas where the plastic is molded perpendicular to a plane in order to help reinforce it. Construction of these pylons or holes is well known to those skilled in the art of building rotomolded components. In an rvft, these strengthening elements can be used and/or function for multiple purposes. For example, they can be used as the holes through which plants extend their roots into the nutrient solution. They can be used as the drains through which nutrient solution exits. They can also be used as the hollow spaces through which the nutrient solution is delivered into the rvft.

Figure 5:
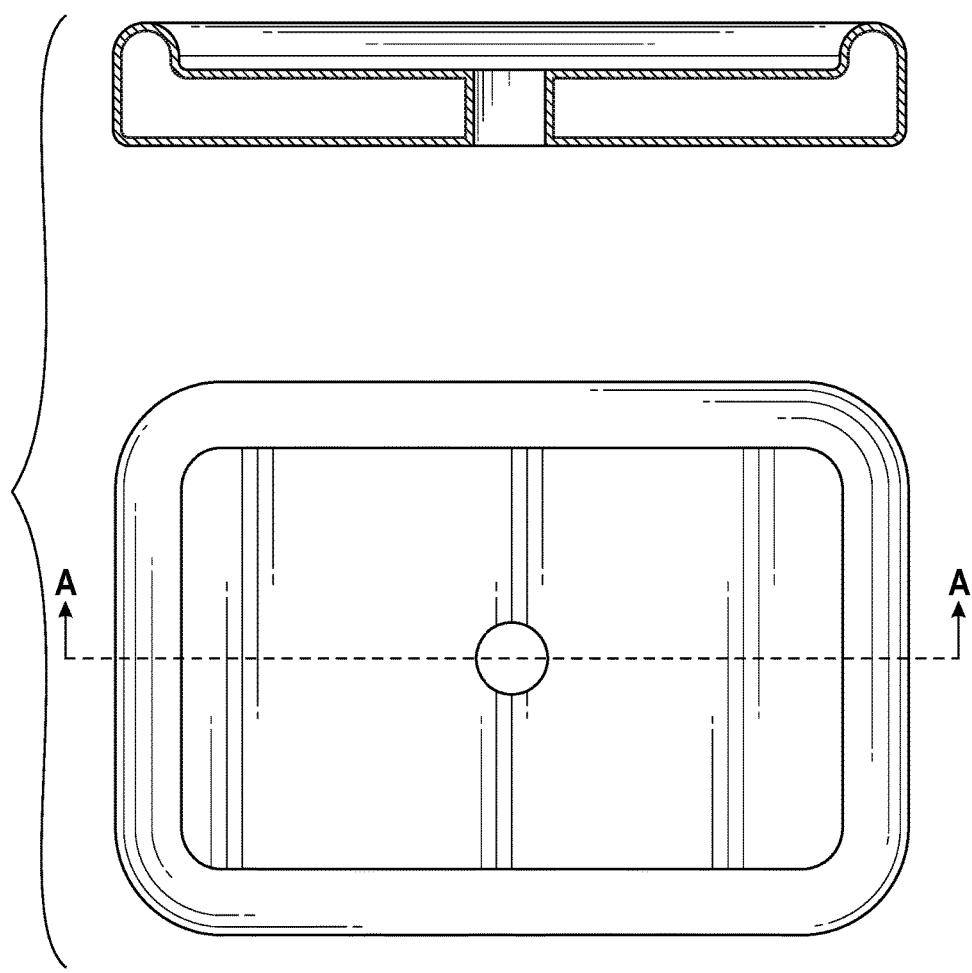
Figure 6:
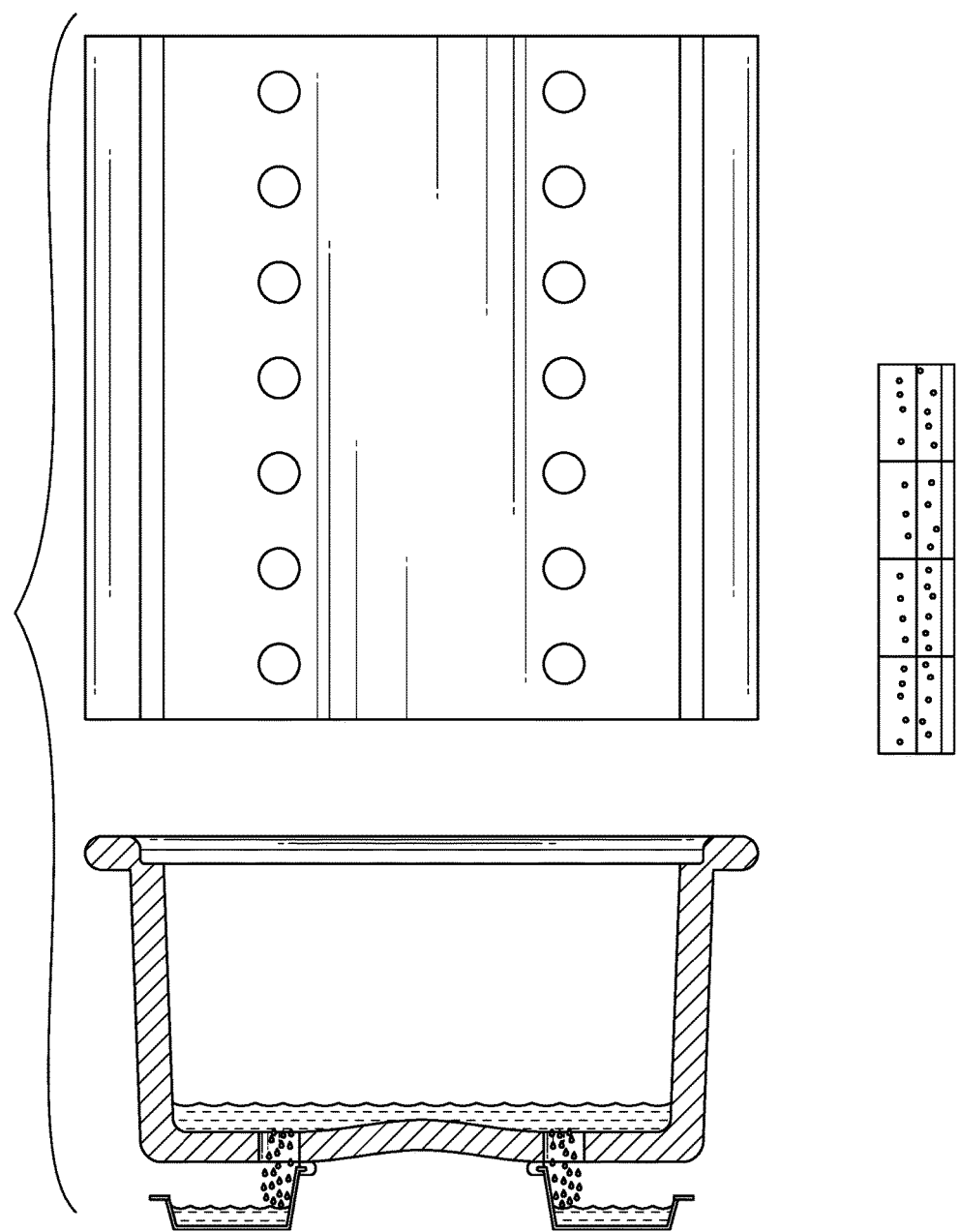
Figure 7:
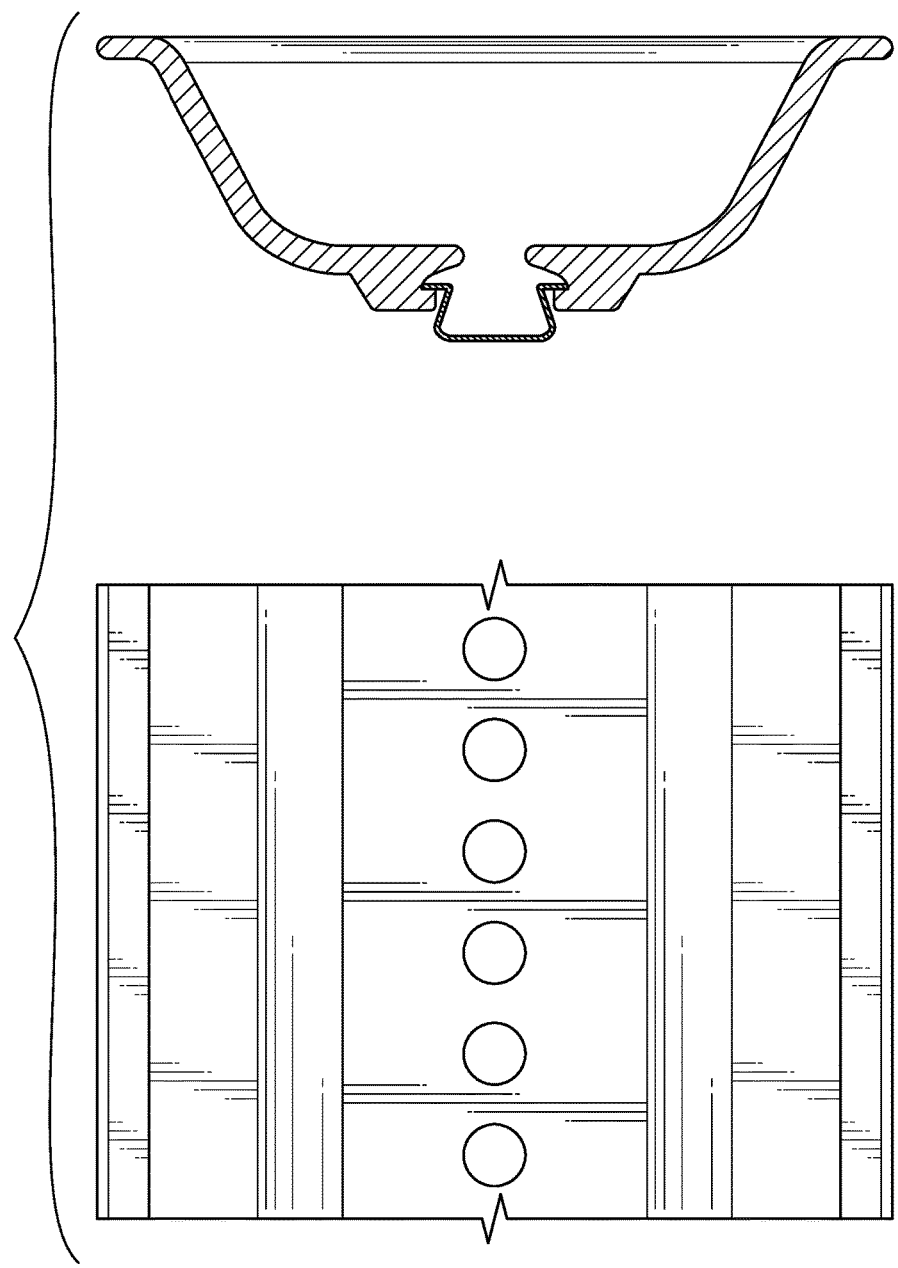
Figure 8:
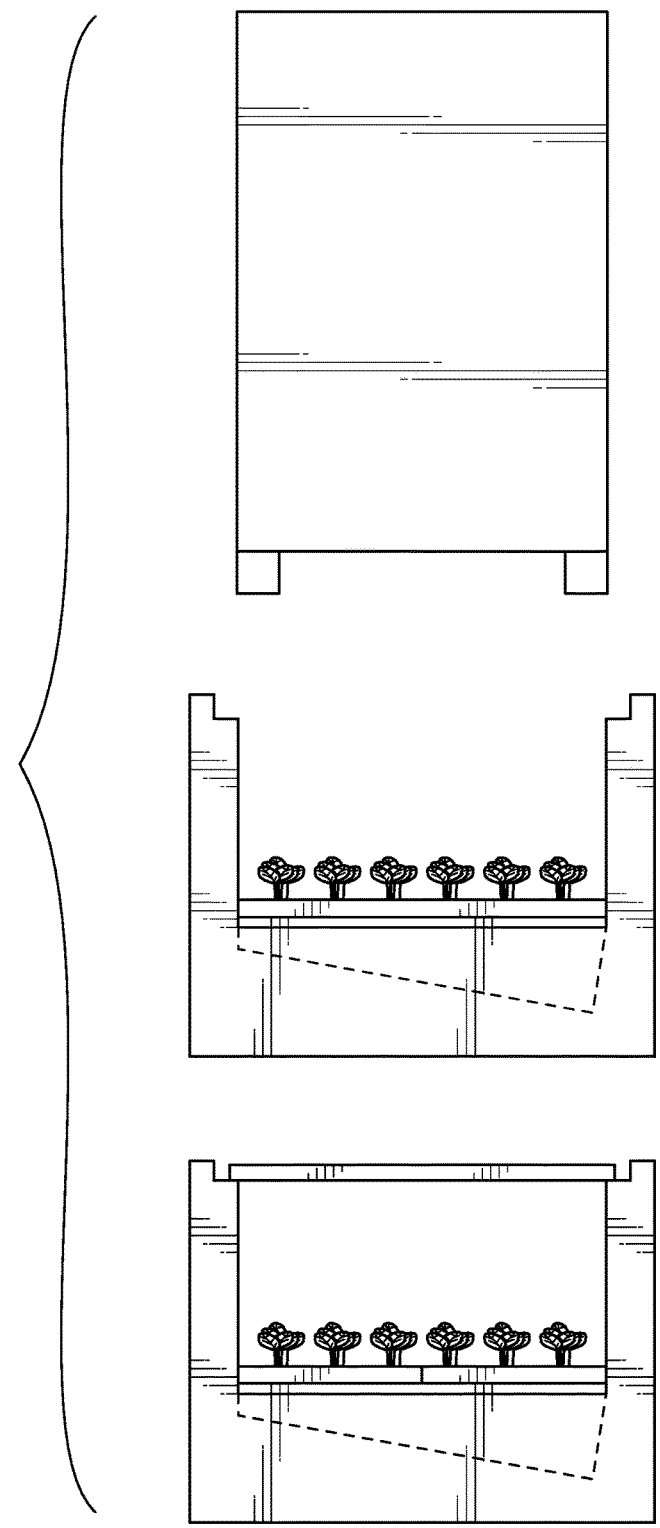
Figure 9:
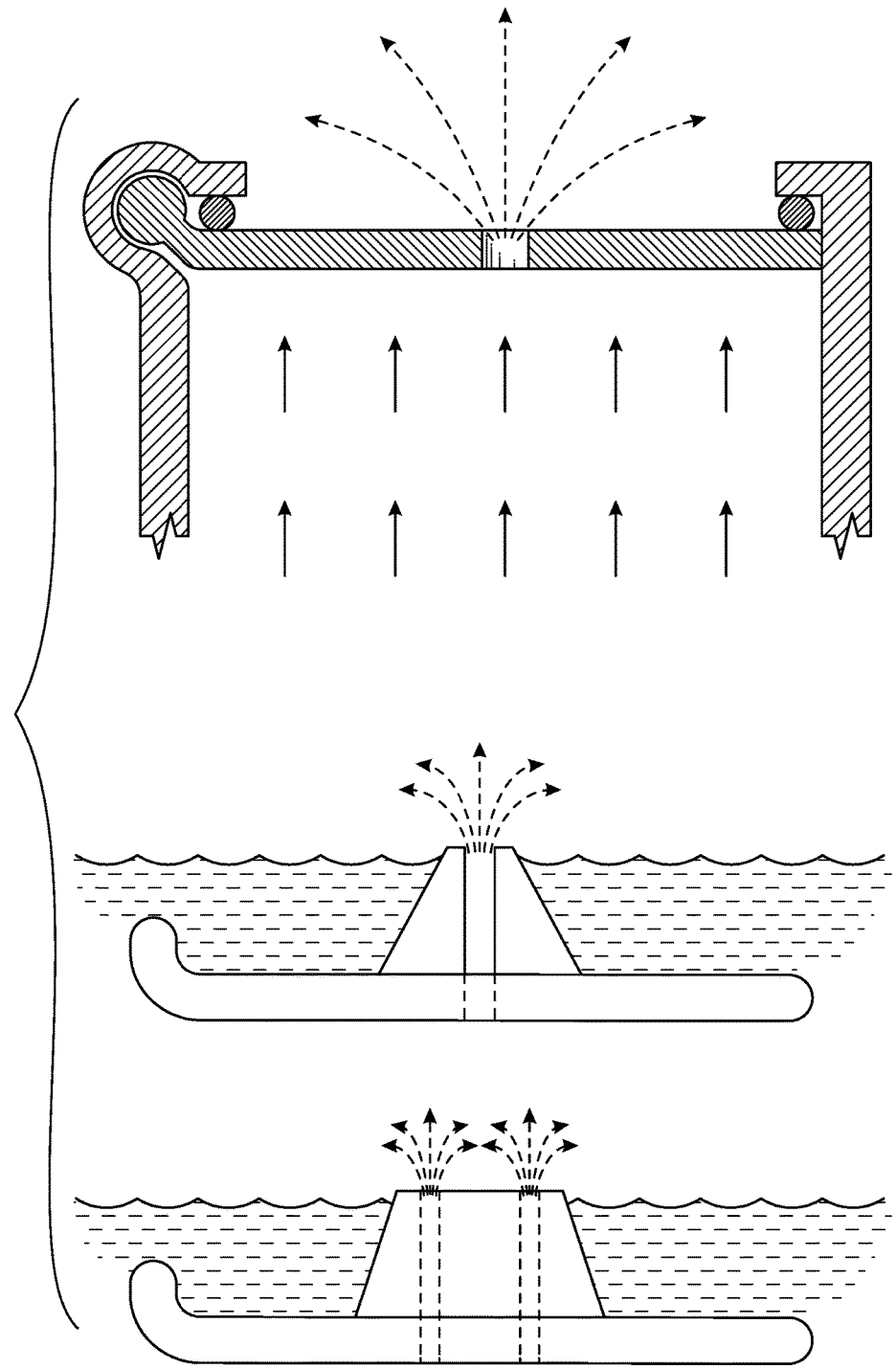
Figure 10:
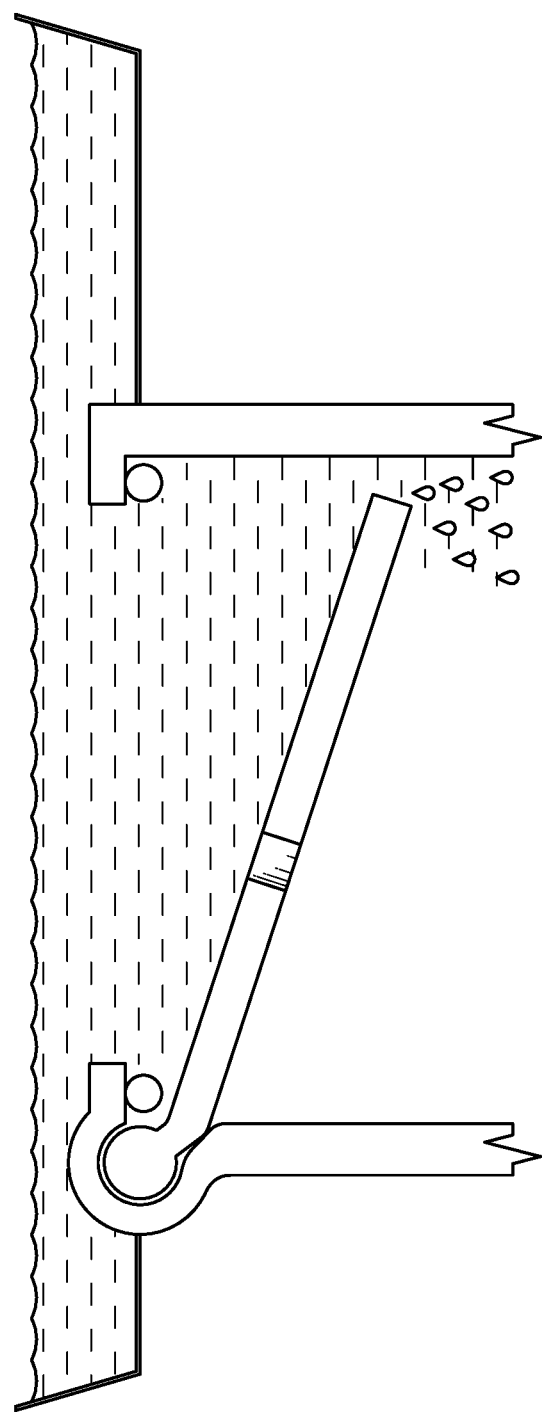
Figure 11:
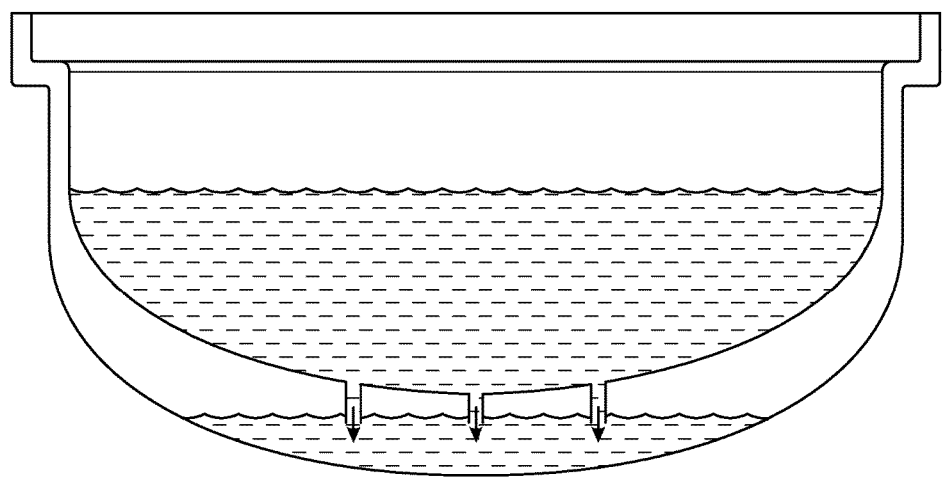
Figure 12:
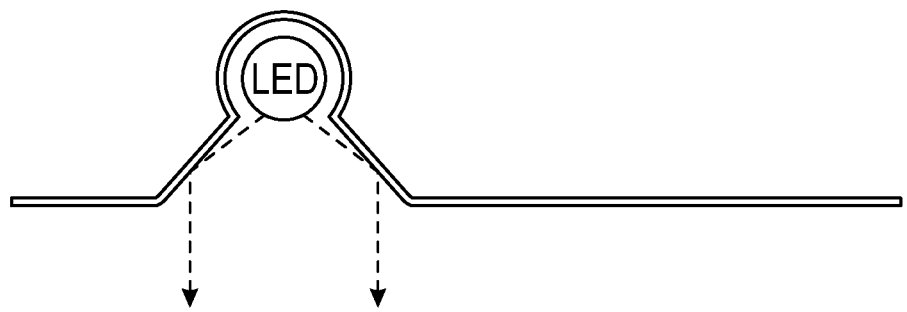
Figure 13:
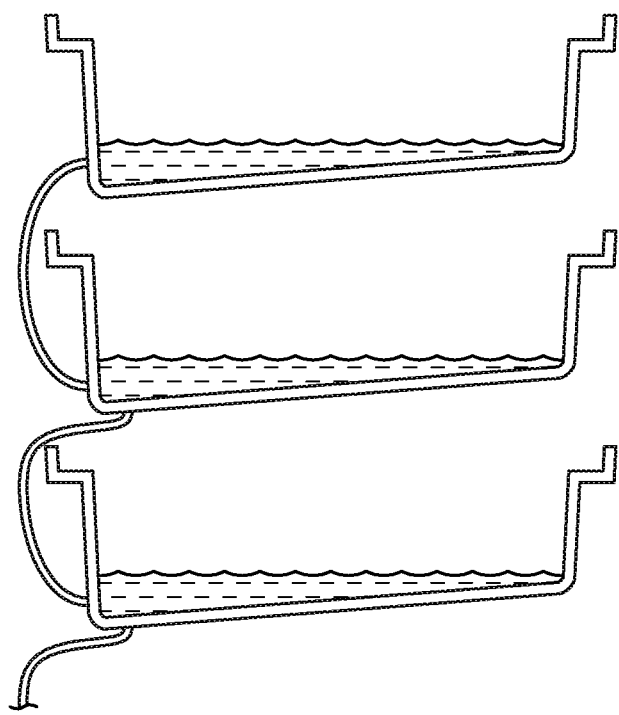
Figure 14:
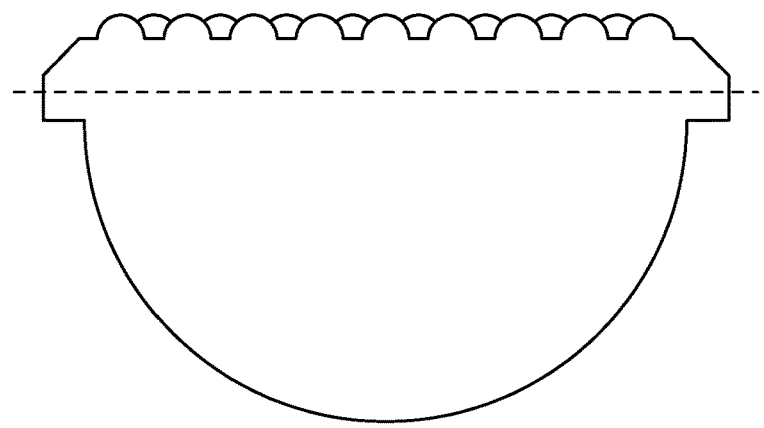

With reference to FIGS. 5 and 6, multiple holes formed in exemplary rvft assemblies of the present disclosure are schematically depicted. With particular reference to FIG. 5, an arch is shown molded into the rvft for strength. In this exemplary embodiment, the holes are also used as drains and are shown draining into a gutter that runs along the length of multiple rvfts. In FIG. 5, two lines of holes are shown draining into each of two gutters.

In a preferred embodiment, the nutrient solution delivery and nutrient solution evacuation can share physical elements. This could include a single plumbing element for alternately flowing nutrient solution into and out of the rvft. A pump can be used to force nutrient solution up through the plumbing elements to flow into the rvft. The pump can be shut off to allow the nutrient solution to drain out of the rvft using gravity. Alternately, a pump can be used to extract the nutrient solution from the rvft at a rate faster than gravity. The plumbing element can include a feature that incorporates both draining and flow modifying elements. The presence or absence of pressure from the nutrient solution delivery pump can move mechanical elements to different positions to change the function between draining functions and flow modifying functions.

In an exemplary embodiment of the present disclosure, the nozzle includes a nozzle portion and a nozzle-flap portion. The nozzle preferably extends above the plane of nozzle-flap seating. This allows the nozzle to spray into air even as the rvft collects liquid. The nozzle may have a plurality of orifices.

When the pipe is pressurized, the fluid pushes the nozzle-flap into the "closed" position. This allows the fluid to pressurize against the nozzle flap and for fluid to be forced through the orifice (or orifices) of the nozzle. In exemplary implementations, the fluid is atomized into a spray by the nozzle.

With the pump off, the nozzle-flap pivots under its own weight or under the weight of the fluid collected in the rvft above. This allows water to drain out from the rvft into the drain line.

In exemplary embodiments, the nozzle-flap is sized so that it will always pivot down under its own weight when fluid under a certain pressure (e.g., less than 5 psi) is not exerting an upward force on the bottom of the nozzle flap.

In a preferred embodiment, holes can be drilled into one wall of the rvft chassis to allow nutrient solution to drain into the interior space between walls of the rvft. This generally moves the nutrient solution to a darker space because the walls of the rvft are generally opaque and protect the nutrient solution from light. Less light energy interacting with the nutrient solution slows the growth rate of algae growing in the nutrient solution.

In a preferred embodiment, the electric light source is an LED lamp. The structure(s) for holding the LED lamp may include ledges, grooves, holes and/or recesses that mechanical elements in the LED lamp can rest upon or attach to. The structure(s) for holding the LED lamp could include a contour that matches a section of the outer perimeter of the LED lamp. In this example, the LED lamp may extend such that when the LED lamp is set into the rvft, it is supported completely by the rvft.

In a preferred embodiment, the rvft further comprises mechanical elements that steer and/or guide the light energy from the LED lamp so that more light energy strikes the plants targeted by the LED lamp than would strike the plants if those elements were not incorporated. These mechanical elements can be comprised of planes or curved surfaces which have high enough reflectivity (typically over 30%) to increase the total amount of light energy delivered to the plants.

This reflectivity can be tuned to be effective for a particular wavelength. For instance, the reflectivity may be achieved by using a blue paint and therefore have high reflectivity in the blue region of 400-500 nm, but lower outside that region. Having reflectivity effective for a particular wavelength can allow the light energy being delivered to impart additional functions to the plants and allow them to grow in a particular way in a particular direction. For instance, blue light may increase the length of the epicotyls of a plant and the rvft may be more effective by directing more blue light to the edges of the growing area to encourage those plants to have longer epicotyls to be able to better compete for light energy with the other plants within the rvft.

The LED lamp mounting mechanism may include a barbed or threaded element that mates into a recess or threaded insert molded into the rvft. In an exemplary embodiment, a barbed shape is molded into the plastic "end cap" which comprises a distal end of the LED lamp. This barbed shape can mate to a recess in the rvft and effectively attach the lamp to the rvft.

A preferred embodiment of the disclosed rvft includes an expanding connector placed through a hole in the LED lamp and into a recess or hole in the rvft. As the expanding connector is engaged, typically by turning a screw to expand a plastic or rubber element on the distal end of the screw, the expanding element secures the LED lamp to the rvft.

In a preferred embodiment, the rvft includes male pegs and female recesses to allow rvfts to be positioned upon each other and supported as designed. These pegs and recesses may be reinforced by mechanical fasteners, such as bolts, which further secure the rvfts to each other.

In another exemplary embodiment, a second component, known as a joiner, may be located in between two rvfts. These joiners may have pegs that extend in two directions to locate into recesses in both of the rvfts being detachably positioned together. These pegs and recesses may be reinforced by mechanical fasteners, such as bolts, which further secure the rvfts to each other. Using a joiner is generally preferred because it allows for a smaller foot print for the rvft within the mold and within the shipping means. By having no peg in the rvft, the height of the rvft is reduced by at least the size of the peg.

In another preferred embodiment, all rvfts that are on a second level or higher elevation drain down into a lower rvft. This allows scalable stacking and utilizes the same plumbing connection for each of the rvfts. The rvfts are generally sized to allow sufficient volume/nutrient solution to flow into them from the rvfts above, e.g., which may generally be up to 20 in number.

In another preferred embodiment, the plants are supported by a growing tray. This growing tray can be formed at the same time as the rvft. This helps ensure that the growing trays and rvfts are the same size, made of the same material, and will continue to mate in all temperatures. In certain implementations, a single walled rvft may be utilized. This is typically lower strength than a double walled rvft, but will provide sufficient strength for most applications.

The growing tray can be comprised of a generally planar surface with a series of recesses. During the manufacturing process, a portion of these recesses (or the entirety of the recesses) can be removed in a secondary operation, such as a punch, laser cut or ban saw cut. The resultant holes may function as the holes through which the plants will extend their roots to reach into the section of the rvft where the nutrient solution is present.

An alternate way of constructing single wall rvfts and growing trays is to build molds which mold two of each at a time. This generally requires a larger mold for the rvfts than when a growing tray and rvft are formed simultaneously in the same mold, but it has the added feature of being able to mold many more growing trays than rvfts, which is desirable to be able to keep up with growing trays being broken or otherwise lost in the operation.

Figure 15:
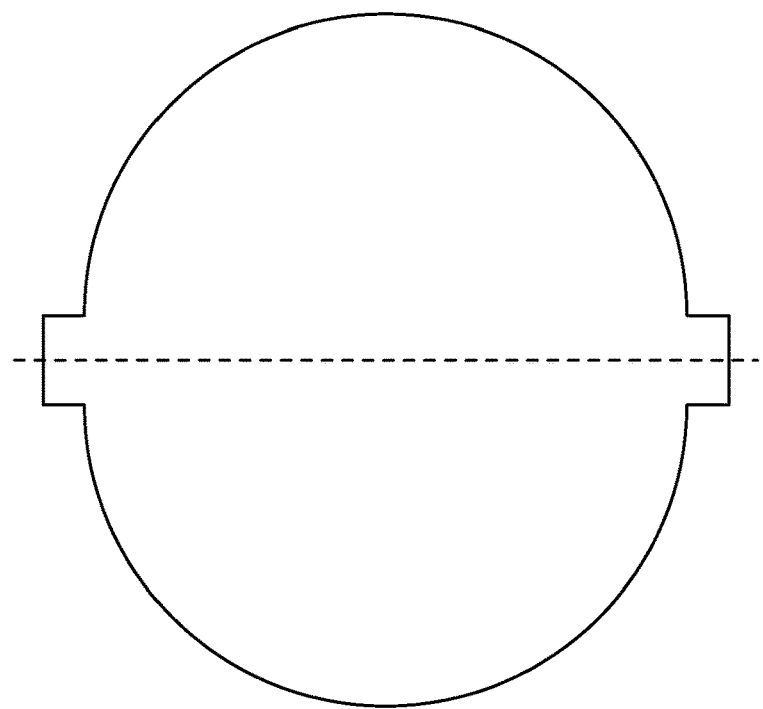
Figure 16:
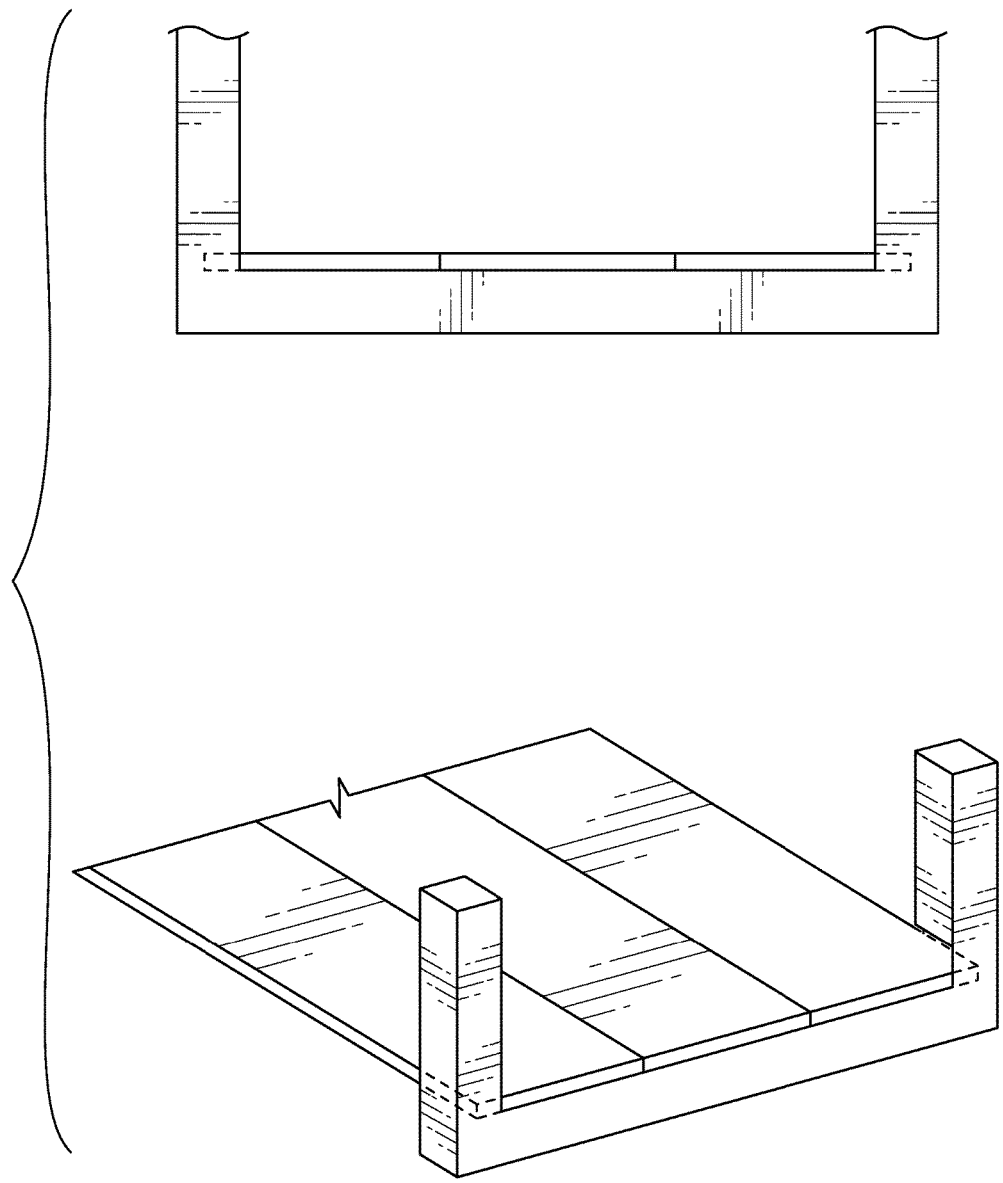
Figure 17:
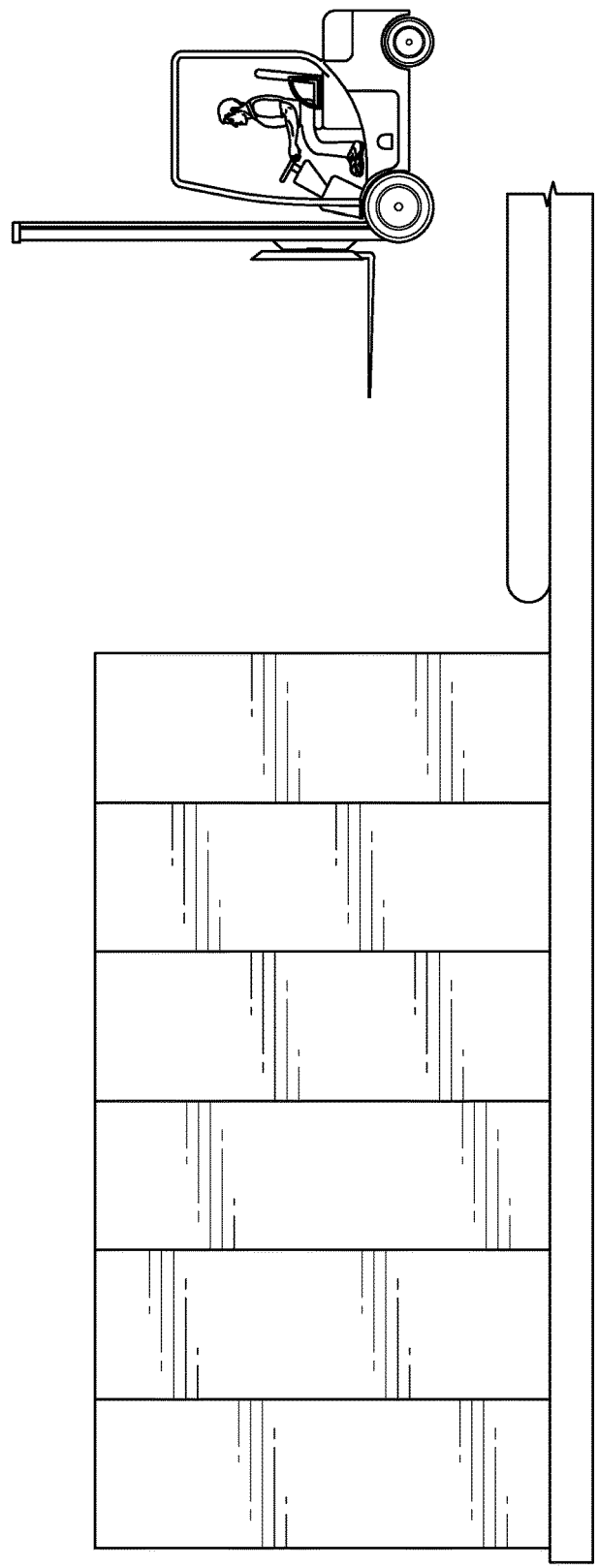
Figure 18:
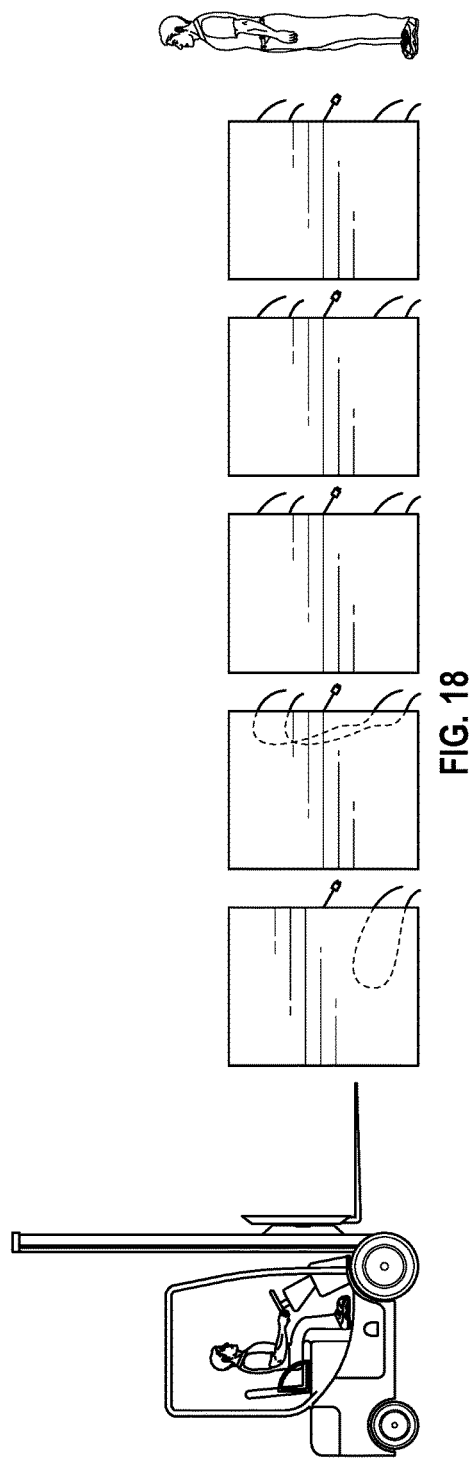
Figure 19:
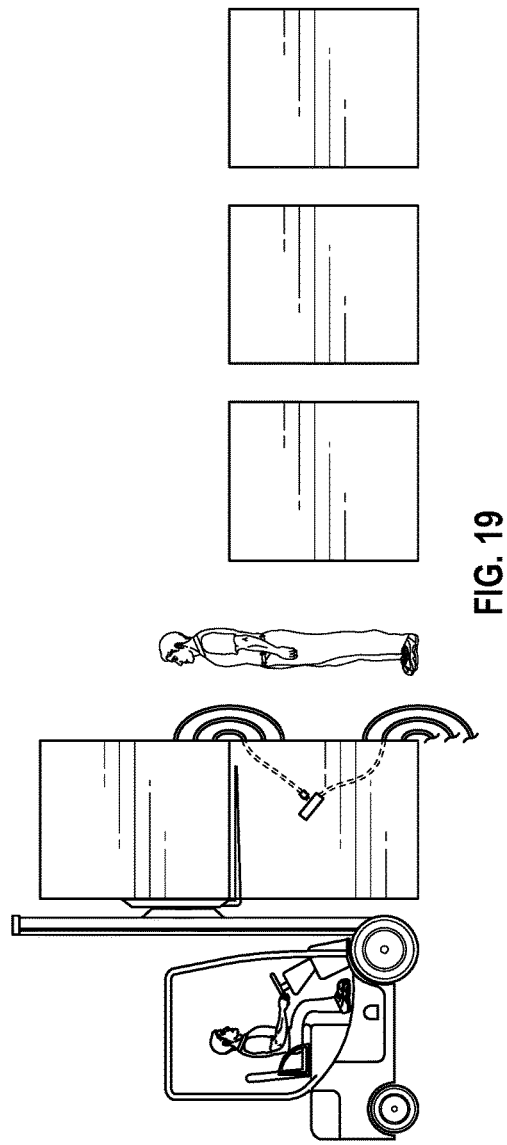
Figure 20:
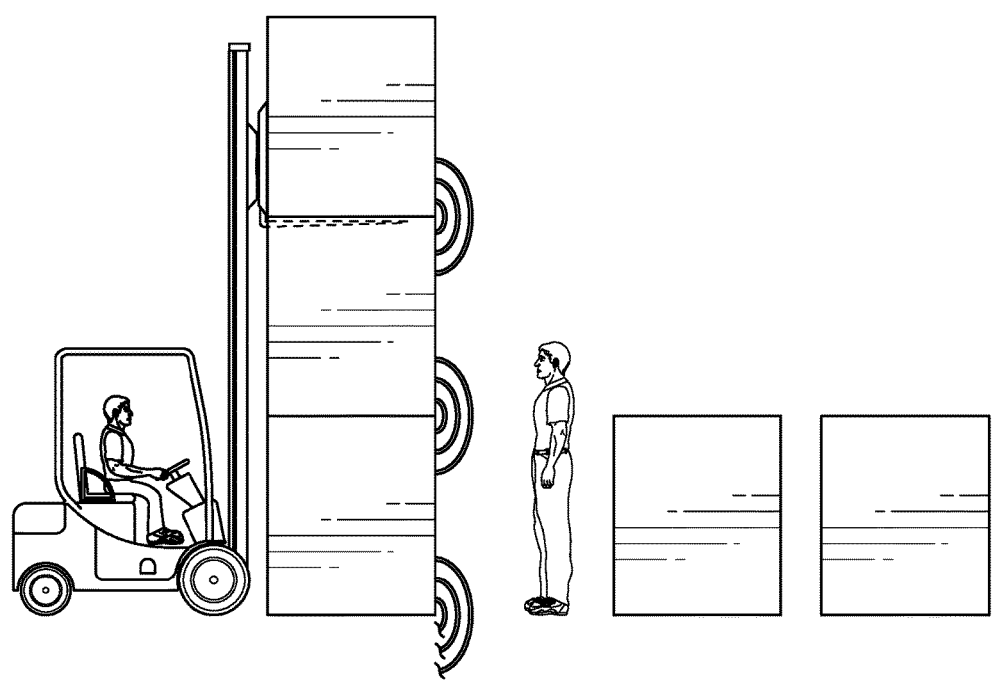
Figure 21:
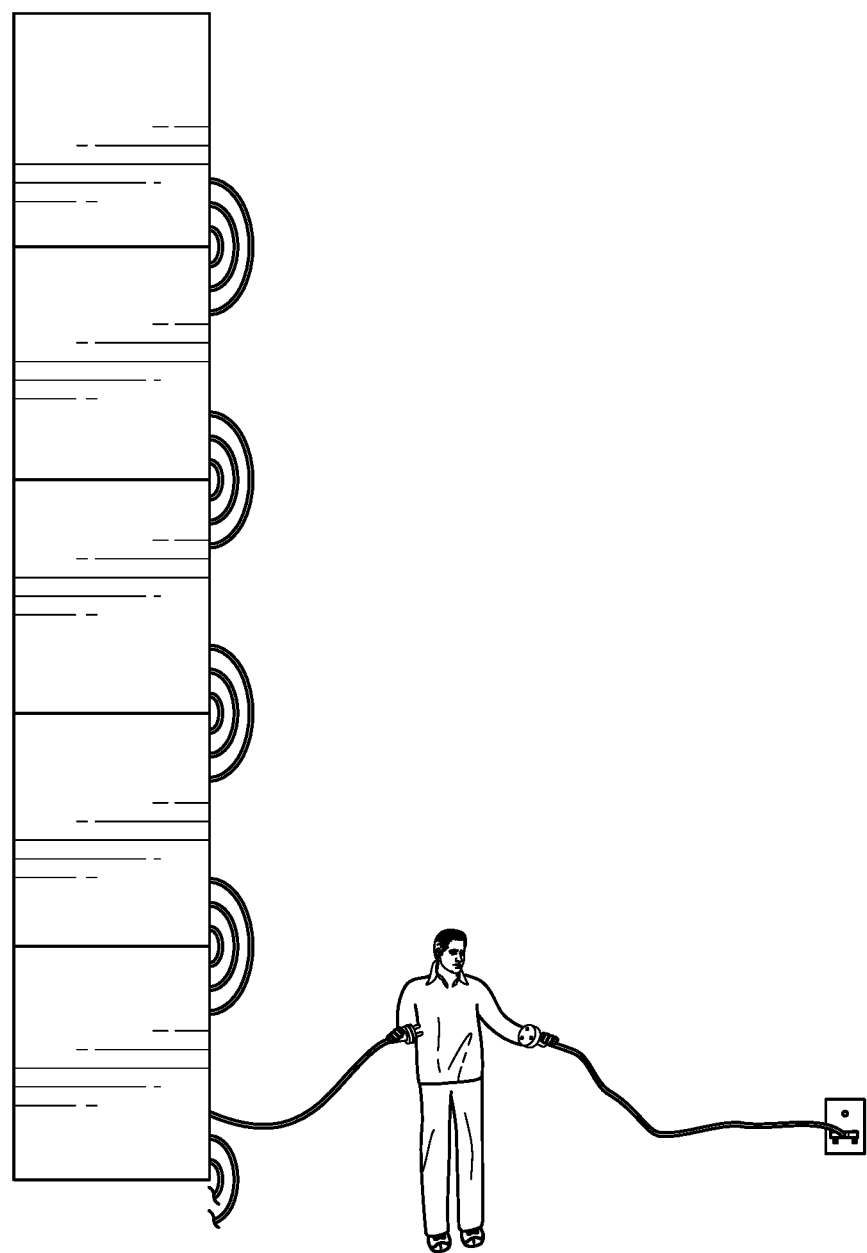
Figure 22:
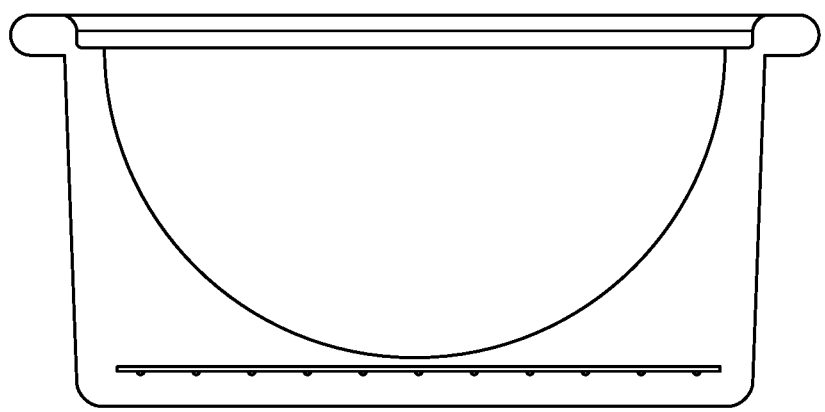

In another preferred embodiment, a plurality of growing trays can be located within each rvft. For instance, if three trays are located within the rvft in the orientation shown in FIG. 15, then the trays can be loaded sequentially 1 then 2 then 3. FIG. 15 shows how the stacking features (shown as large mechanical structures in each corner) can block the trays numbered 1 and 2 from being slid directly out of the rvft. It is advantageous to have the stacking features extend in this direction because it helps minimize the overall footprint of the machine without decreasing the growing area.

The stacking elements generally need to be sized sufficiently to support many rvfts stacked one upon the other. While this large size must be attained, increasing the overall perimeter of the rvft will decrease the % of area that is used for growing and reduce the overall effectiveness of the farm employing the rvfts. To the extent that the stacking elements can be included in a small area along the perimeter of the growing area, the efficiency is optimized.

When it is time to remove the growing trays, they will have leaves growing above the plane and roots growing below. It is advantageous to prevent the roots from touching the leaves as the roots may contain items that could contaminate the leaves and create a health risk, reduce marketability of the product, or require a costly washing step.

For this reason, tray 3 is generally removed first, and then tray 2 will be slid to the left (into the position vacated by tray 3) and then removed. Likewise, tray 1 will be slid to the right and then removed. The result of this design is that the stacking features can be very large within the unloading plane, which can vastly increase strength and reduce overall footprint In a preferred embodiment, the rvft will include connectors and stacking features which allow a plurality of rvfts to be moved at one time using a forklift. This embodiment can have electrical and plumbing connections made by one person standing on the ground—preventing use of ladders, man lifts or other devices which require more time and add a degree of personal safety risk.

A person on the ground can make connections for all rvfts currently within arms reach of the ground (which may be up to 3 rvfts at a time). Then a forklift may be used to raise those rvfts and place them on top of the next set of rvfts and the process continues.

In FIGS. 17-20, the outer arcs represent the nutrient solution supply lines and the middle arcs represent the nutrient solution drain lines. The curved inner arcs adjacent to the nutrient supply/drain lines show the electrical connection for the LED lights.

It is noted that the stack of rvfts may be constructed without using a ladder or manlift. When it is time to load the rvfts with plants, a manlift or ladder may be used then and for other periodic tasks like cleaning. But for the construction of the vertical farm, no ladder or manlift is generally used.

In a preferred embodiment, the LEDs are located within the rvft. This requires that the rvft have a generally transparent surface (typically over 50% transmitting) for the LEDs to direct their light energy therethrough. The LED light source is placed during molding and the conductors supplying electricity are routed through the wall of the rvft or the rvft molds over a connector or over the conductors themselves.

In a preferred embodiment, the rvft includes cavities that are sized and located in a manner consistent with the size and shape of typical pallets. This will allow typical forklifts and pallet jacks to be able to move the rvfts.

In a preferred embodiment, the rvfts are able to stack for shipping in a manner that is more compact than the stacked sized used during operation. This could include stacking one upside down onto another. It could include nesting the rvfts such that one sits at least partially within another. This nesting technique is particularly effective if a joiner is being used to connect two rvfts. The preferred stacking may be in an orientation different than the orientation typical of operation, for instance, they may stack "up ended" one upon another.

Although the word plane is used to describe the surface where plants are grown, those skilled in the art will recognize that it is not a mathematical plane. The plants necessarily create depressions in their growing medium as they grow. For this reason, wherever the term plane is used to describe where plants grown, it can be replaced with "generally planar" or even "curved" or contoured or even generally a conic section or generally a spherical section.

Although the present disclosure has been described with reference to exemplary embodiments thereof, the present disclosure is not limited by or to such exemplary embodiments. Rather, various modifications, enhancements and/or refinements may be implemented without departing from the spirit or scope of the present disclosure.

What is claimed is:

1. A growing system comprising:
   a. a rotomolded chassis that defines:
      i. an interior configured and dimensioned for positioning of plants, and
      ii. an exterior that at least partially defines a perimeter around the interior,
   b. the chassis comprising stacking elements which allow one chassis to be stacked one upon the other,
   c. means for delivering liquid into the chassis,
   d. means for draining liquid from the chassis, and
   e. means for supporting plants that is conducive to their growing within the chassis,
   wherein the rotomolded chassis is of dual wall design.

2. The growing system according to claim 1, further comprising means for containing liquid within the chassis below a plane of the plants.

3. The growing system according to claim 2, wherein the means for containing liquid extends around the entire perimeter of the rotomolded chassis so that in normal operation, no liquid exits the chassis except through the means for draining liquid.

4. The growing system according to claim 3, wherein the normal operation includes all operations where the volume of water in the rotomolded chassis is less than the volume bounded by the rotomolded chassis and the plane where the plants are growing.

5. The growing system according to claim 1, wherein the dual wall design completely encloses at least one hollow cavity that is essentially sealed from the environment.

6. The growing system according to claim 1, wherein the means for delivering liquid into the chassis is comprised of a hollow space defined by the outer surface of the rotomolded chassis.

7. The growing system according to claim 1, wherein the means for draining liquid into the chassis is comprised of a hollow space defined by the outer surface of the rotomolded chassis.

8. The growing system according to claim 1, wherein a wall thickness is over 0.1".

9. The growing system according to claim 1, wherein the means for supporting plants is a ledge molded into the chassis.

10. The growing system according to claim 1, wherein the means for supporting plants is a step molded into the chassis.

11. The growing system according to claim 1, wherein the means for supporting plants is a protrusion molded into the chassis.

12. The growing system according to claim 1, wherein the means for supporting plants is a plurality of elements molded into the chassis.

13. The growing system according to claim 1, wherein the means for supporting plants comprises at least one element that is attached to the chassis.

14. The growing system according to claim 13, wherein the at least one element is attached with an adhesive.

15. The growing system according to claim 13, wherein the at least one element is attached by sliding into a groove or channel on the chassis.

16. The growing system according to claim 13, wherein the attached element is of lower coefficient of friction than the chassis.

17. The growing system according to claim 13, wherein the at least one element is attached with a mechanical fastener.

18. The growing system according to claim 1, wherein the stacking elements are comprised of male protrusions on one chassis and female recesses on a mating chassis.

19. The growing system according to claim 1, wherein the stacking elements are comprised of pegs protruding from one chassis and female holes on a mating chassis.

\* \* \* \* \*